United States Patent [19]

Tervo

[11] Patent Number: 4,989,638

[45] Date of Patent: Feb. 5, 1991

[54] SUBSTANTIALLY LEAK-FREE DISCONNECTION APPARATUS

[75] Inventor: John N. Tervo, Scottsdale, Ariz.

[73] Assignee: Allied-Signal, Morris County, N.J.

[21] Appl. No.: 454,234

[22] Filed: Dec. 21, 1989

[51] Int. Cl.⁵ .......................................... F16L 37/28
[52] U.S. Cl. ............................ 137/614.01; 137/614; 251/291
[58] Field of Search ............. 137/614, 614.01, 614.03, 137/614.06; 251/291

[56] References Cited

U.S. PATENT DOCUMENTS

| | | | |
|---|---|---|---|
| 232,279 | 9/1880 | Lawrence | 137/614.01 |
| 1,215,481 | 2/1917 | Cantin | 137/614.01 |
| 2,712,454 | 7/1955 | Love | 137/614.01 |
| 2,934,915 | 5/1960 | Morse | 62/299 |
| 3,106,223 | 10/1963 | Cooper | 137/614.01 |
| 3,129,716 | 4/1964 | Fox | 137/68.1 |
| 3,155,370 | 11/1964 | Drumm et al. | 137/614.06 |
| 3,670,770 | 6/1972 | Nelson | 137/614.05 |
| 3,797,510 | 3/1974 | Torres et al. | 137/614.04 |
| 4,323,094 | 4/1982 | Paulis et al. | 137/614.03 |
| 4,565,212 | 1/1986 | Klein et al. | 137/613 |

FOREIGN PATENT DOCUMENTS 541322  5/1922  France ............................ 251/291

Primary Examiner—A. Michael Chambers
Attorney, Agent, or Firm—Joseph R. Black; James W. McFarland; Robert A. Walsh

[57] ABSTRACT

A disconnection apparatus (88) comprises two disconnect members (12,14) which are interfaced to define a continuous channel (28,29) extends therethrough, and two cylindrical cartridges (84,86) slidably disposed in the channel (28,29). The channel (28,29) intersects two flow paths (70,72) formed in the disconnect members (12,14). The cartridges (84,86) are positionable in the channel (28,29) to block both flow paths (70,72) and are operative to re-direct fluid in order to prevent leakage when the members (12,14) are disconnected.

23 Claims, 4 Drawing Sheets

SUBSTANTIALLY LEAK-FREE DISCONNECTION APPARATUS

TECHNICAL FIELD

The present invention relates to disconnection apparatus for use with fluid systems, generally. More specifically, the invention relates to disconnection apparatus which are designed for substantially leak-free disconnection and maintenance.

BACKGROUND OF THE INVENTION

In fluid transfer or containment systems, it is desirable to provide for disconnection with minimal leakage. This is of particular importance when the fluid is a hazardous chemical, or when the fluid system is employed in space where leakage presents the singularly cumbersome task of clean-up in a zero-gravity environment.

An objective of this invention is to provide a substantially leak-free disconnection apparatus.

A further objective of the invention is to provide a disconnection apparatus suitable for use in space or in systems which incorporate hazardous chemicals.

A still further objective of the invention is to provide a disconnection apparatus adapted for substantially leak-free maintenance.

The word "cartridge" as used herein is intended to convey that an item so denominated is easily changed or replaced. However, despite any conventional use to the contrary, the word "cartridge" is not intended herein to express a limitation that the item so denominated is a case or container.

SUMMARY OF THE INVENTION

The invention comprises two disconnect members which cooperatively form a cylindrical channel that intersects each of two flow paths formed in the disconnect members, and two cylindrical cartridges slidably disposed in the cylindrical channel. The cartridges are positionable in the channel to permit fluid communication between the two flow paths, or to block such communication when disconnection is desired.

The cartridges preferably incorporate near one end a check valve that functions to drain fluid back into the flow paths as the cartridges are positioned for disconnection of the two disconnect members, and further incorporate near an opposite end a female portion of a coupling, whereby the cartridges can be retracted from each other or withdrawn from the disconnection apparatus for maintenance or replacement.

The cartridges may further incorporate an auxiliary flow path whereby either cartridge can be positioned to provide continuing fluid communication between the forementioned two flow paths while the other cartridge is withdrawn from the disconnection apparatus.

DESCRIPTION OF THE PREFERRED EMBODIMENT

Figure 1:
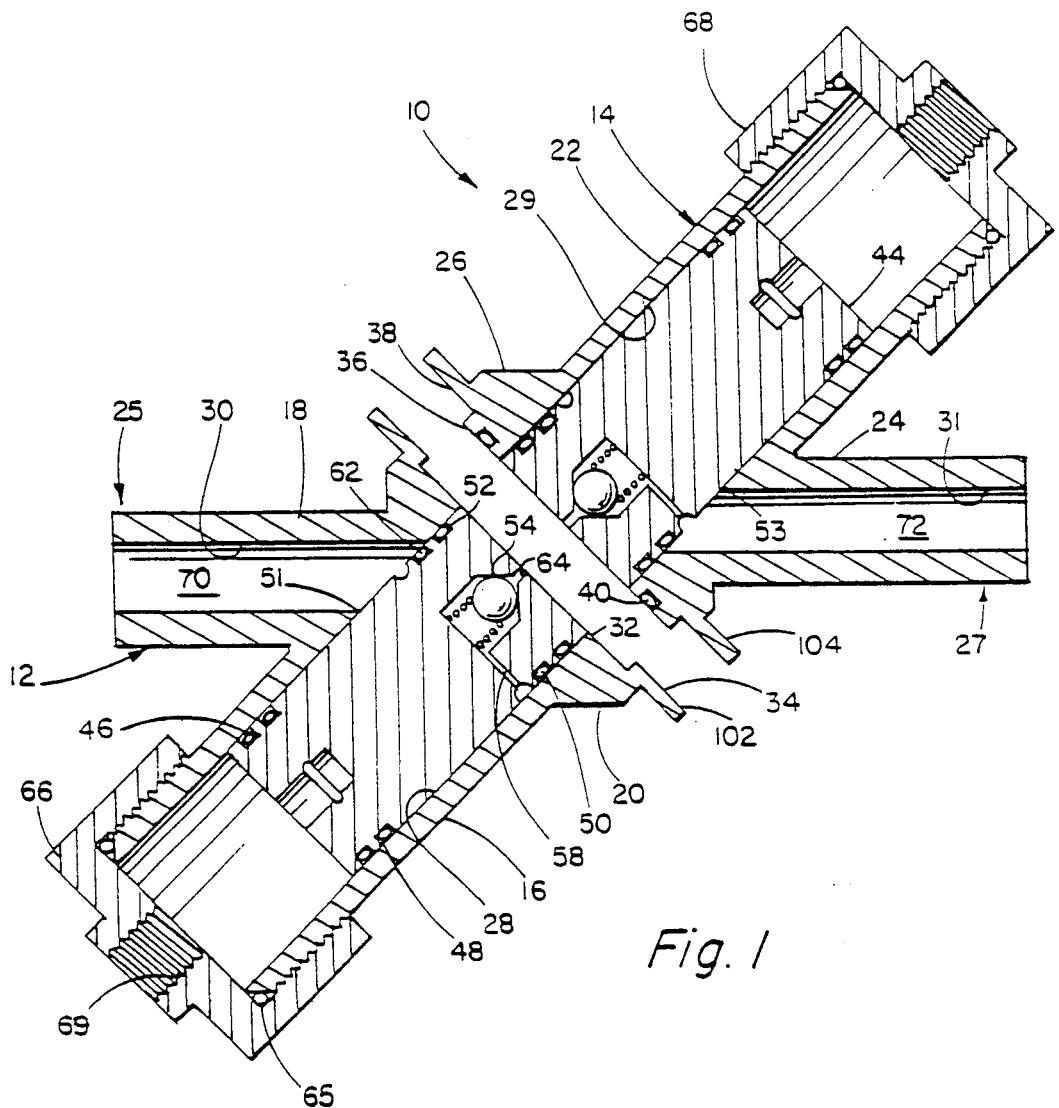
FIG. 1 is a generally cross-sectional and partially schematic view of a disconnection apparatus in an uncoupled configuration.

Referring to FIG. 1, the disconnection apparatus 10 of the present invention comprises first and second disconnect members 12, 14. The disconnect members may be formed by any suitable means, such as casting, for example, and are composed of any material suitable for a particular application. Typically, the range of suitable materials will depend on such factors as the physical properties of the flow medium, the fluid pressure to which the apparatus 10 will be subjected, and the environment in which the apparatus will be used. The selected material or materials may then dictate the available manufacturing options.

The first disconnect member 12 has a larger-diameter cylindrical projection 16 and a smaller-diameter cylindrical projection 18, which converge as indicated toward a generally conical portion 20. Similarly, the second member 14 has these projections and the conical portion 22, 24, 26. The ends 25, 27 of the smaller-diameter cylindrical projections 18, 24 are suitably adapted, if necessary, to accommodate engagement with conduits. Each of the members 12, 14 has a larger cylindrical bore 28, 29 extending axially through its larger-diameter cylindrical projection and conical portion. Each has a smaller cylindrical bore 30, 31 extending axially through its smaller-diameter cylindrical projection and intersecting the associated larger bore. The conical portion 20 of the first member 12 has at its base an inner annular seat 32 and an outer annular boss 34. The former is dimensioned to receive an inner annular boss 36 formed at the base of the conical portion 26 of the second member 14. Accordingly, the second member 14 has an outer annular seat 38 onto which the outer annular boss 34 is positioned when the members 12, 14 are coupled. The inner boss 36 has an annular recess formed therein to accommodate receipt of an annular seal 40.

Cylindrical cartridges 42, 44 are slidably disposed in the larger cylindrical bores 28, 29. The outer, cylindrical surfaces of the cartridges 42, 44 have annular recesses at four locations as indicated to accommodate receipt of annular seals (as at 46, 48, 50, 52). The corners 51, 53 defined at the intersections of the larger and smaller bores are burnished or rounded to prevent interference with the seals 46, 48, 50, 52. Each cartridge (as at 42) is adapted at one end to provide a check valve 54, and at an opposite end to provide the female portion 56 of a detent coupling. A drain passage 58 is formed between the chamber 60 of the check valve 54 and a fifth annular recess 62. An axially-disposed passage 64 is formed between the one end of the cartridge 42 and the chamber 60. The coupling may be a detent coupling as suggested, a threaded coupling, or any functionally similar arrangement by which the cartridge 42 can be pulled away from the cartridge 44 or withdrawn from the cylindrical bore 28.

The larger cylindrical projections 16, 22 are threaded near their remote ends for engagement with end caps 66, 68. Each end cap (as at 66) has an axially disposed bore 69 formed therethrough to provide access to the associated cartridge 42. Annular seals (as at 65) are provided between the end cap 66 and the associated larger cylindrical portion 16.

Figure 2:
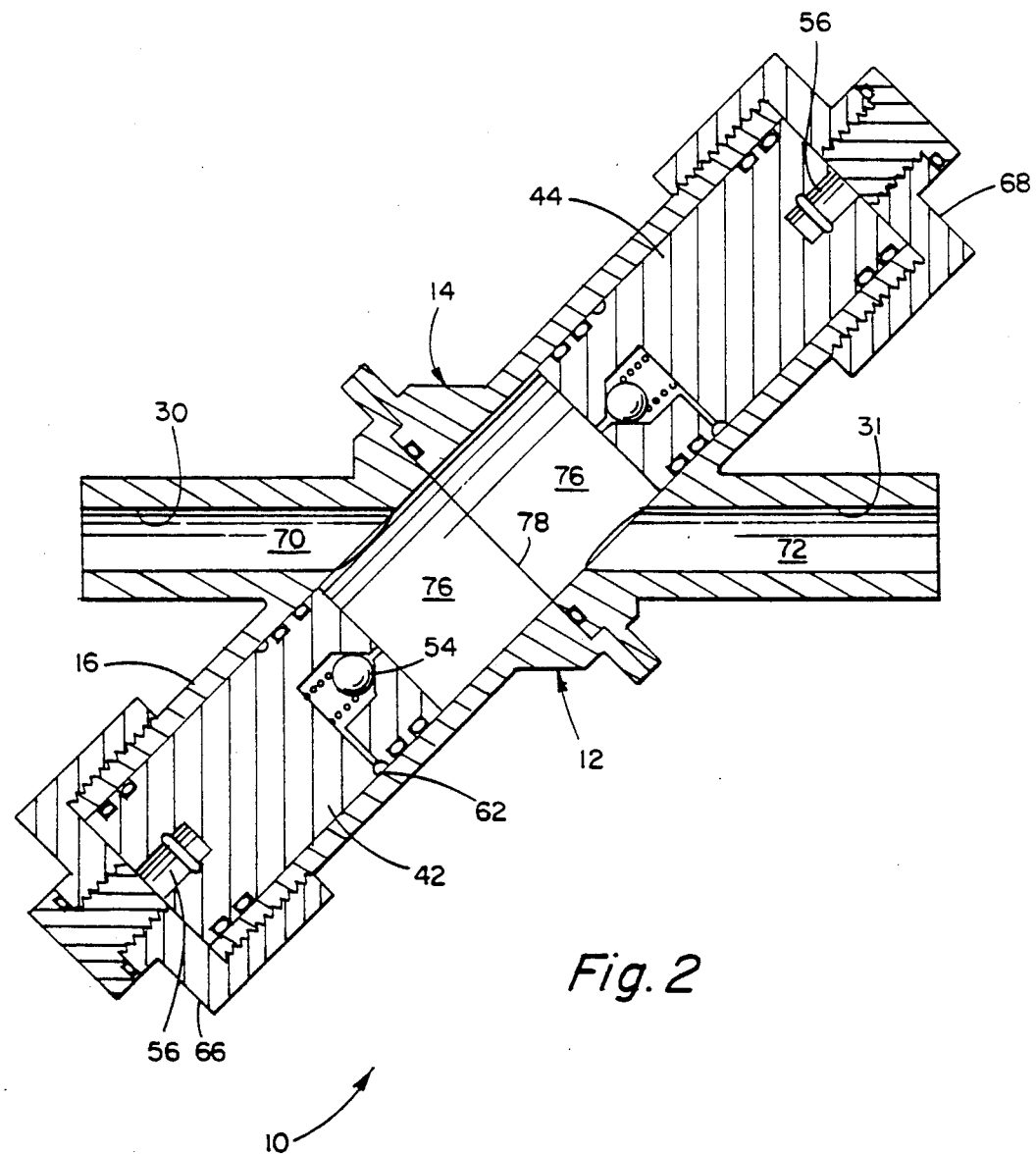
FIG. 2 corresponds in kind to FIG. 1, and illustrates the apparatus in a coupled configuration.

FIG. 2 shows the disconnect member 12, 14 in interfacing relationship. The smaller bores 30, 31 define first and second flow paths 70, 72. The larger bores 28, 29 (FIG. 1) form a substantially continuous channel extending between the end caps 66, 68. Within this channel the cartridges 42, 44, when at least partially spaced-apart, define a cylindrical chamber 76. The flow paths 70, 72 are in fluid communication via the chamber 76 when the cartridges 42, 44 are sufficiently retracted to open both flow paths.

Viewing FIGS. 1 and 2, during normal operation of the fluid system incorporating the apparatus 10, the cartridges 42, 44 are retracted as indicated in FIG. 2. The cartridges 42, 44 can be extended toward or retracted from the interface 78 by use of any suitable tool which is adapted to engage the female plug 56 of the cartridge. When disconnection is required, the cartridges 42, 44 are pushed forward to the interface 78. As the cartridge 42 in the first member 12 is extended toward the interface 78, excess fluid in the chamber 76 flows through the check valve 54, to the annular recess 62, and to the first flow path 70. Similarly, as the cartridge 44 in the second member 14 is extended, any remaining excess fluid flows through the associated check valve, and via the associated annular recess to the second flow path 72. As indicated in FIG. 1, when both cartridges 42, 44 are extended to the interface 78, they close fluid communication along the flow paths 70, 72. Accordingly, when the members 12, 14 are disconnected as indicated in FIG. 1, leakage should be limited to any film of fluid which remains at the interface 78 upon disconnection.

In order to remove either of the cartridges 42, 44 for maintenance or replacement, (taking cartridge 42 as an example) the other cartridge 44 is extended past the interface 78 until it blocks both flow paths 70, 72. The end cap 66 is then removed from the first member 12, and the cartridge 42 is withdrawn from the larger portion 16.

Figure 3:
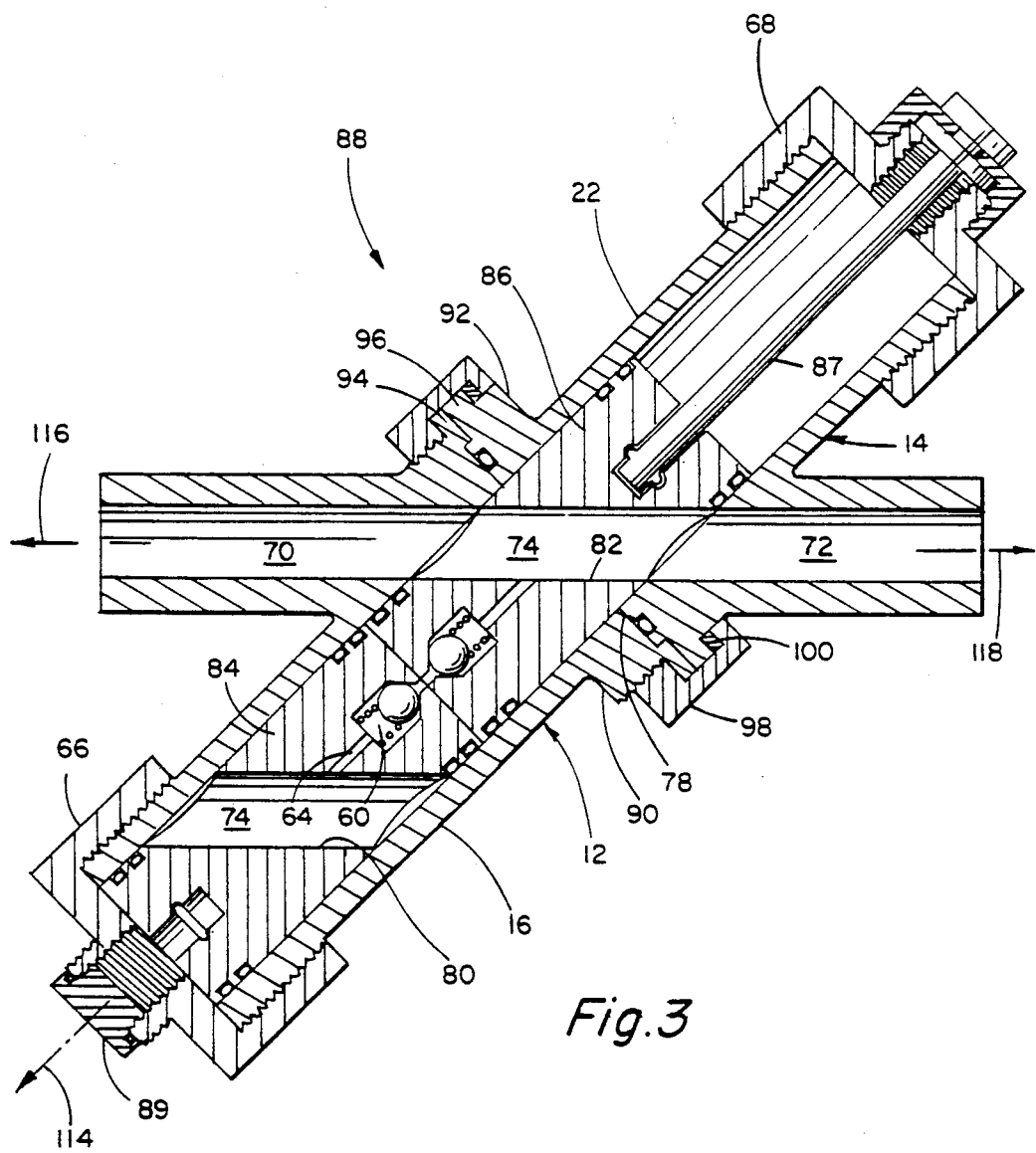
FIG. 3 is a generally cross-sectional and partially schematic view of a disconnection apparatus incorporating the cartridge illustrated in FIG. 5.

FIG. 3 illustrates an alternative embodiment adapted to provide for continuation of fluid transfer when a cartridge is withdrawn from its associated disconnection member. Laterally-extending bores 80, 82 are formed through the cartridges 84, 86 as indicated, thereby defining auxiliary flow paths 74. The drain passage 64 extends from the check valve chamber 60 to the auxiliary flow path 74. As is evident from the drawing, the first cartridge 84 can be withdrawn from the first disconnection member 12 while the second cartridge 86 is positioned so that its auxiliary flow path 74 provides fluid communication between the flow paths 70, 72. The cartridges 84, 86 and large projections 16, 22 are dimensioned so that when the cartridges abut each other and one (e.g. the first cartridge 84) abuts its associated end cap 66, the other (e.g. the second cartridge 86) is positioned for linear alignment of its auxiliary flow path 74 with the first and second flow paths 70, 72. The second cartridge 86 is maintained in proper rotational alignment by a male coupling member 87 which engages the second cartridge and is rigidly but removably secured to the second end cap 68. A removable threaded bolt 89 is sealingly secured to the first end cap 66. During normal operation, flow proceeds through the auxiliary flow path 74 of the second cartridge 86. This provides a combined flow path 70, 72, 74 of uniform cross-sectional area, which is generally more favorable than the combined flow path 70, 76, 72 illustrated in FIG. 2. When disconnection is desired, both cartridges 84, 86 are positioned relative to the interface 78 as are the cartridges 42, 44 in FIG. 1. In that position, the cartridges 84, 86 block the flow paths 70, 72.

The apparatus 88 of FIG. 3 is also designed differently from that of FIG. 1 in that the conical portions 20, 26 (FIG. 1) are replaced with generally cylindrical portions 90, 92 having flanges 94, 96. The cylindrical portion 90 of the first member 12 is threaded for engagement with a locking collar 98 which interlocks the disconnect members 12, 14. A retaining ring 100 is provided between the locking collar 98 and the flange 96. Intersecurement of the disconnect member 12, 14 in FIG. 1 can be provided via bolts (not shown) extending through flanges 102, 104.

Figure 4:
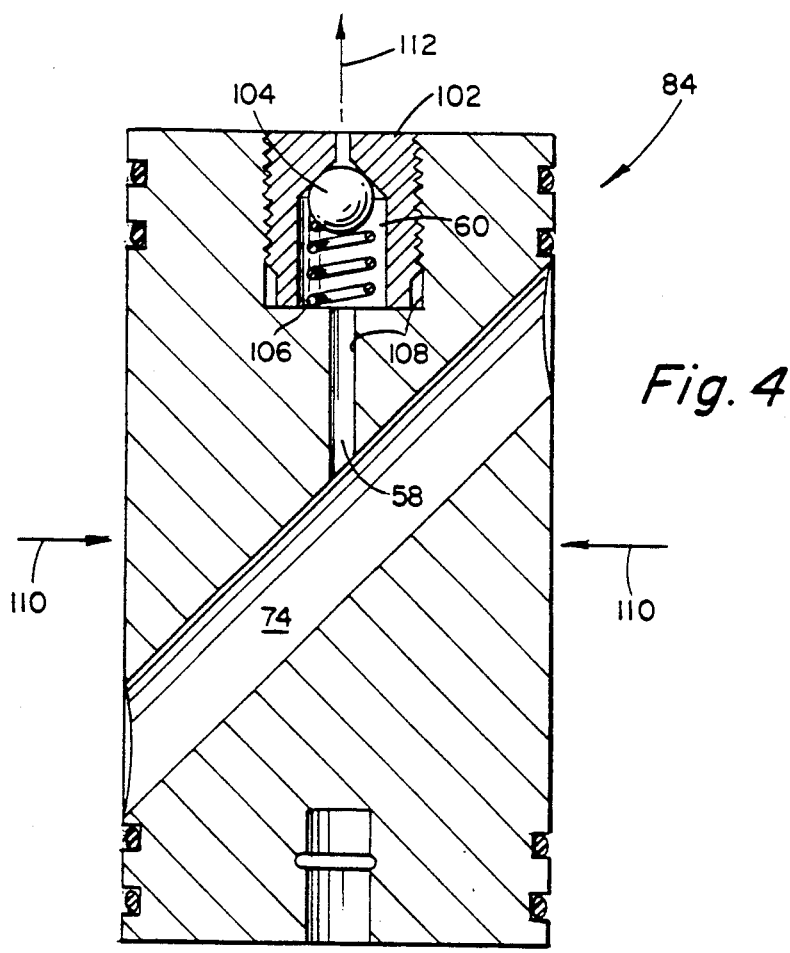
FIG. 4 is a cross-sectional view illustrating the use of a cylindrical adaptor for replacing the cartridges illustrated in FIGS. 1 and 3.

FIG. 4 illustrates the cartridges 84, 86 of FIG. 3 in more detail. A male-threaded plug 102 has an axially-extending bore formed therein to define the check-valve chamber 60. A ball 104 and biasing spring 106 are inserted in the chamber 60 as shown. An axially-extending stepped bore 108 is formed in the cartridge 84 and partially tapped to provide the drain passage 58 and to accommodate installation of the plug 102. (The cartridge 42 of FIG. 1 is cross-drilled from the annular recess 62 to the check-valve chamber 60 in order to provide the drain passage 58). The bore 80 formed through the cartridge 84 is laterally central as viewed in the directions indicated by the arrows 110, and is angled relative to the axis 112 to match the angular relationship between the axis 114 (FIG. 3) of the continuous channel formed by the larger bores 28, 29 (FIG. 1) and the axes 116, 118 of the flow paths 70, 72 (FIG. 3).

Figure 5:
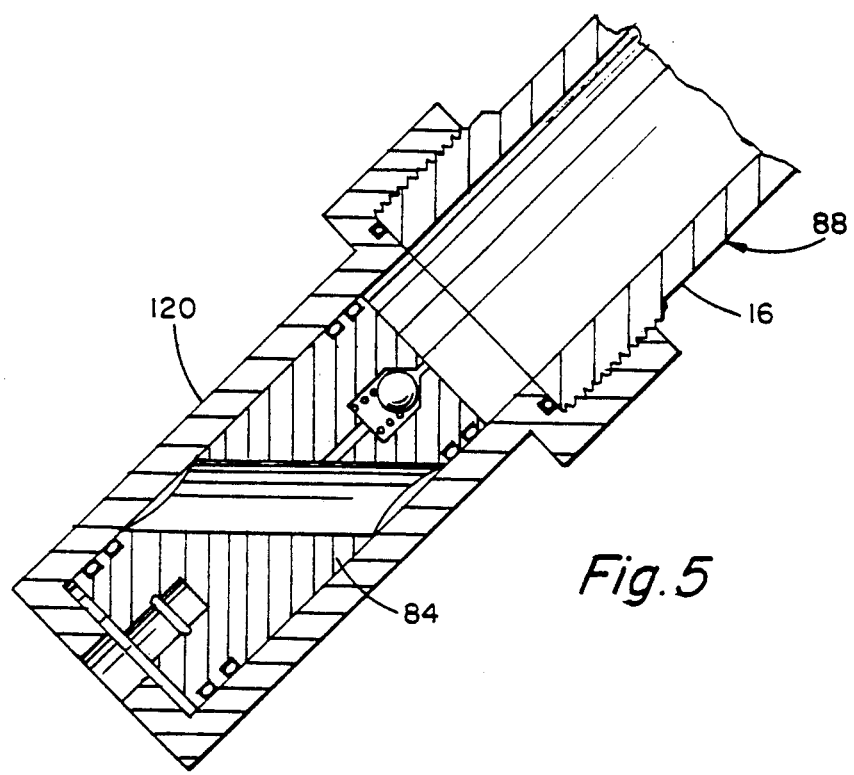
FIG. 5 is a more detailed cross-sectional view of the cartridge illustrated in FIG. 3.

FIG. 5 illustrates an adaptor 120 for removing cartridges without loss of fluid. When cartridges of the type illustrated in FIG. 1 are removed, there is potential for loss of fluid which remains in the drain passage 58, check valve chamber 60, and annular recess 62. When cartridges of the type illustrated in FIG. 3 are removed there is the additional potential for loss of fluid which remains in the auxiliary flow path 74. The adaptor 120 is simply an elongated version of the end caps 66, 68 but has an inside diameter matching that of the larger cylindrical portions 16, 22. When a cartridge is to be withdrawn for replacement, the associated end cap (not shown in FIG. 4) is removed and replaced with an adaptor 120. The cartridge 84 is withdrawn from the apparatus 88 and into the adaptor 120. The adaptor 120 is then removed with the cartridge 84, a fresh cartridge is inserted in the apparatus 88, and the end cap is screwed back onto the apparatus. The adaptor 120 and the replaced cartridge can then be taken to a remote site for proper disposition of the entrapped fluid.

The reader should understand that the foregoing portion of the description, which includes the accompanying drawings, is not intended to restrict the scope of the invention to particular embodiments thereof or to particular details which are ancillary to the teaching contained herein. Accordingly, the invention should be construed as broadly as is consistent with the following claims and their equivalents.

What is claimed is:

1. Disconnection apparatus, comprising:
   a first disconnect member, said member having a smaller bore formed therein to provide a first flow path, said member having a larger cylindrical bore formed therethrough and intersecting said smaller bore;

a second disconnect member, said second member having a smaller bore formed therein to provide a second flow path, said second member having a larger cylindrical bore formed therethrough intersecting said smaller bore formed therein, said second member being in interfacing relationship with said first member whereby said larger cylindrical bores are coaxial and cooperatively form a channel that extends through said members and intersects said flow paths; and first and second cylindrical cartridges slidably disposed in said channel, said first cartridge being positionable to block said first flow path where the latter is intersected by said channel, said second cartridge being positionable to block said second flow path where the latter is intersected by said channel.

2. The invention of claim 1 wherein said cartridges are positionable in spaced-apart relationship within said channel and, when so positioned, cooperatively define therebetween a cylindrical-chamber portion of said channel, said cartridges being positionable to provide fluid communication between said flow paths via said cylindrical-chamber portion.

3. The invention of claim 2 wherein each of said cartridges is positionable in said channel to close fluid communication between said channel and both of said flow paths.

4. The invention of claim 2 wherein said first cartridge is adapted to provide a passage extending from said cylindrical-chamber portion through said first cartridge to said first flow path, and further comprising a check valve disposed in said passage to permit one-way fluid communication from said cylindrical-chamber portion to said first flow path.

5. The invention of claim 2 wherein said second cartridge is adapted to provide a passage extending from said cylindrical-chamber portion through said second cartridge to said second flow path, and further comprising a check valve disposed in said passage to permit one-way fluid communication from said cylindrical-chamber portion to said second flow path.

6. The invention of claim 5 wherein said first cartridge is adapted to provide a passage extending from said cylindrical-chamber portion through said first cartridge to said first flow path, and further comprising a check valve disposed in said passage to permit one-way fluid communication from said cylindrical-chamber portion to said first flow path.

7. The invention of claim 6 wherein said cartridges are positionable in said channel so as to abut each other while simultaneously blocking said first and second flow paths, whereupon said cylindrical-chamber portion is undefined.

8. The invention of claim 6 wherein each of said cartridges is adapted to receive a male coupling member whereby each is retractable from the other.

9. The invention of claim 8 wherein said first and second disconnect members comprise first and second projections, respectively, through which said larger cylindrical bores are formed, and further comprising:
a first end cap secured to a distal end of said first projection, said end cap being adapted for access of said coupling member to said first cartridge through said end cap; and
a second end cap secured to a distal end of said second projection, said second end cap being adapted for access of said coupling member to said second cartridge through said second end cap.

10. The invention of claim 2 wherein each of said cartridges has an auxiliary flow path extending laterally therethrough, and wherein each is positionable in said channel to provide fluid communication between said first and second flow paths via said auxiliary flow path.

11. The invention of claim 10, wherein each of said cartridges is adapted to couple with a tool suitable for use in positioning said cartridges in said channel.

12. The invention of claim 11 wherein said first cartridge is adapted to provide a passage extending between its auxiliary flow path and said cylindrical-chamber portion, and further comprising a check valve disposed in said passage to permit one-way fluid communication from said cylindrical-chamber portion to said auxiliary flow path.

13. The invention of claim 11 wherein said second cartridge is adapted to provide a passage extending between its auxiliary flow path and said cylindrical-chamber portion, and further comprising a check valve disposed in said passage to permit one-way fluid communications from said cylindrical-chamber portion to said auxiliary flow path.

14. The invention of claim 13 wherein said first cartridge is adapted to provide a passage extending between its auxiliary flow path and said cylindrical-chamber portion, and further comprising a check valve disposed in said passage to permit one-way fluid communication from said cylindrical-chamber portion to said auxiliary flow path.

15. The invention of claim 11 wherein said first and second disconnect members comprise first and second projections, respectively, through which said larger cylindrical bores are formed, and further comprising:
a first end cap removably secured to a distal end of said first projection, said end cap being adapted for securement of said tool thereto; and
a second end cap removably secured to a distal end of said second projection, said second end cap being adpated for securement of said tool thereto.

16. The invention of claim 15 wherein each of said cartridges is adapted to provide a passage extending between its auxiliary flow path and said cylindrical-chamber portion, and further comprising a check valve disposed in each passage to permit one-way fluid communication from the cylindrical-chamber portion to the associated auxiliary flow path.

17. The invention of claim 1 wherein said first and second disconnect members comprise first and second projections, respectively, through which said larger cylindrical bores are formed, and further comprising:
a first end cap secured to a distal end of said first projection, said end cap being adapted for access of a positioning tool to said first cartridge through said end cap; and
a second end cap secured to a distal end of said second projection, said second end cap being adapted for access of a positioning tool to said second cartridge through said second end cap.

18. The invention of claim 17 wherein each of said cartridges is positionable in said channel to close fluid communication between said channel and both of said flow paths.

19. The invention of claim 18 wherein said first cartridge is adapted to provide a passage extending from said cylindrical-chamber portion through said first cartridge to said first flow path, and further comprising a check valve disposed in said passage to permit one-way fluid communication from said cylindrical-chamber portion to said first flow path.

20. The invention of claim 18 wherein said second cartridge is adapted to provide a passage extending from said cylindrical-chamber through said second cartridge to said second flow path, and further comprising a check valve disposed in said passage to permit one-way fluid communication from said cylindrical-chamber portion to said second flow path.

21. The invention of claim 20 wherein said first cartridge is adapted to provide a passage extending from said cylindrical-chamber portion through said first cartridge to said first flow path, and further comprising a check valve disposed in said passage to permit one-way fluid communication from said cylindrical-chamber portion to said first flow path.

22. The invention of claim 1 wherein said cartridges are positionable in said channel to simultaneously block said first and second flow paths.

23. The invention of claim 1 wherein each of said cartridges has a flow path extending laterally therethrough, and wherein each is positionable in said channel such that its flow path is interposed between said first and second flow paths and cooperates therewith to provide a continuous flow path through said disconnection apparatus.

* * * * *